Figure 1:
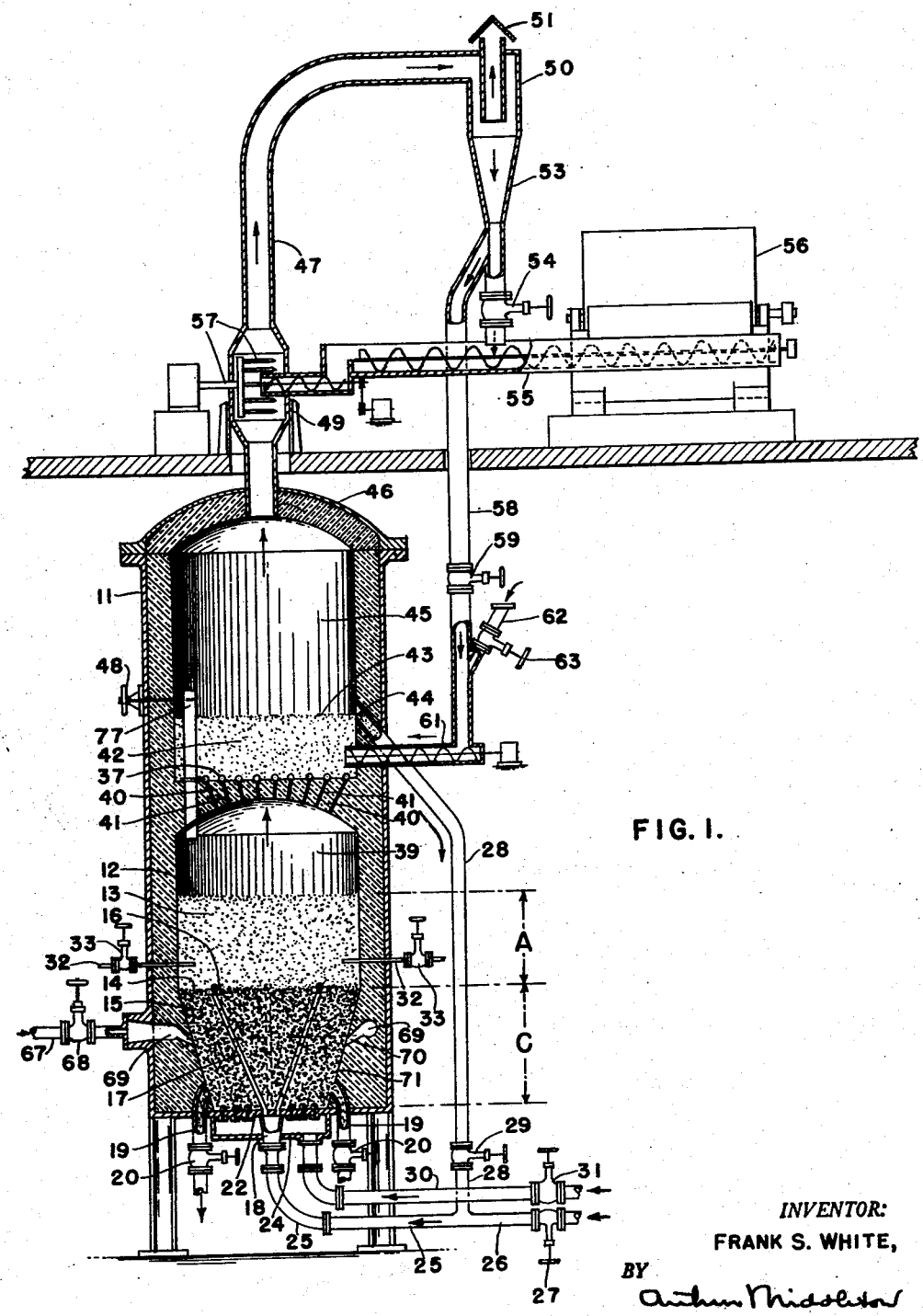

Aug. 25, 1953  F. S. WHITE  2,650,084
CALCINING LIME BEARING SLUDGES
Original Filed June 28, 1946  2 Sheets-Sheet 1

FIG. I.

INVENTOR:
FRANK S. WHITE,
BY
ATTORNEY

Patented Aug. 25, 1953

2,650,084

UNITED STATES PATENT OFFICE 2,650,084

CALCINING LIME BEARING SLUDGES

Frank S. White, Stockbridge, Mass., assignor to The Dorr Company, Stamford, Conn., a corporation of Delaware Original application June 28, 1946, Serial No. 680,191. Divided and this application February 26, 1949, Serial No. 78,569

3 Claims. (Cl. 263—53)

This invention relates to the calcination among other things to trade sludges that are lime-bearing, such as paper mill causticizing sludge, water softening sludge, sludge from first carbonation or other lime sludge producing stations in sugar factories, and so on.

Such sludges are currently burned or calcined in kilns or reverberatory furnaces but the expense thereof is high and their operation not particularly efficient, partly because of lack of close temperature control both generally and locally, and high dust losses. So it is one object of this invention to devise ways and means for overcoming such disadvantages. Another object is to devise ways and means whereby such sludges or solids and particularly precipitated calcium carbonate ($CaCO_3$) can be calcined by the use of heated fluidized beds of the material being treated without the usual high dust losses or loss of fines. By fluidized bed is meant a reactor or furnace wherein the bed of the material being treated is fluidized or mobilized to simulate a fluid by an upwardly flowing stream of reaction gas, the bed being continually maintained by admission of fresh feed at the bottom and continually discharging treated material descendingly from the bed. The reaction gas upflowing through the bed of solids is given a velocity high enough to fluidize or mobilize the larger solids or lumps. This naturally tends to blow the fines out of the bed to loss. So it is an important object of this invention to minimize this latter loss and to maximize to retention and calcination of the fines within the bed.

This patent application is a division from my patent application Serial No. 680,191, filed June 28, 1946, now Patent No. 2,465,410, issued March 29, 1949, the drawings and most of the description thereof being the same in both applications. In the parent case, emphasis was given to the calcining of the lime-bearing material and the nodulization or pelletization of that material prior to its discharge from the reactor by the presence in the material of the bed of a heat-responsive adhesive. The emphasis of this case has nothing to do with the presence or absence of such adhesive because its end product need not be nodulized at all. The emphasis is directed to the discovery that fine powdery material can be calcined by fluidization processes without the usual prohibitively high dust-losses if the expedient is used of having present in the fluidized bed at the time the fines are fed thereto, a substantial quantity of incandescent calcinable coarser solids or lumps. In other words, I have found that if a bed of calcinable larger bed solids is fluidized and brought up to incandescent calcining temperature, with velocity of the fluidizing gas sufficient to mobilize these larger solids and thus of course high enough to blow fine solids from the bed, such fines when fed to the bed beneath its upper surface or fluid-level unexpectedly and unobviously will not be so blown but are somehow retained in the bed irrespective of the gas velocity being high enough for normally blowing out such fines and they will be so retained as long as a significant quantity of such incandescent larger solids are present.

These objects are attainable by establishing and maintaining in an enclosing reactor or furnace, one or more beds whose solids are heated to calcining temperature and are supported above a gas-permeable plate or partition through which reaction gas is forced at a velocity for fluidizing the coarser solids whereby they simulate a turbulent boiling fluid. Solids are continually fed to the bed and treated solids continually removed therefrom. This treatment is characterized in that the reactor has present in it coarser solids, namely having a grain size lying in a range of from minus 14 to plus 65 screen mesh (Tyler) to which is supplied fine calcium carbonate powder such as dried water-softening sludge. The bed can then be fluidized and heated to calcination temperature. The dried $CaCO_3$ powder working its way through the bed of coarse material is rapidly decomposed to calcium oxide and carbon dioxide gas. Upon leaving the bed, entrained solids can be separated from the gas by a dust collector. Small additional quantities of coarse material may be added from time to time to compensate for attrition losses.

The fluidized coarse-and-fine bed permits the obtaining of the principal advantages of the fluidizing process, some of which are uniform temperature control, surface combustion, intimate gaseous-solids contact, and rapid heat transfer.

The invention may be practiced in an enclosed reactor or furnace, more or less vertical in type, divided by a transverse horizontally-extending gas-permeable plate or partition, into a gas-receiving or wind-box compartment beneath the plate and a solids heat-treatment zone or compartment thereabove. A bed of solids to be treated is supported by the plate by means of an oxygen-bearing gas or air blown into and through the bed of solids so that at least the solids in the upper section or zone of the bed are in mobilized non-segregating suspension in the gas whereby they are in fluidized condition and thereby act as if they comprised a fluid.

Fuel is supplied to the upper zone of the bed to maintain combustion or oxidation therein. Solids are fed for treatment in the reactor into the upper zone of the bed. Calcined solids are discharged from the bottom section of the lower zone of the bed. Products of combustion are discharged from the top section of the reactor. The reactor is operable on a continuous basis. The sludge or solids to be fed are more or less dried and pre-heated by rising hot products of combustion from the reactor, whereupon they are conducted into the middle section of the bed in the reactor—the middle section being that toward the bottom of the superjacent fluidization zone of the bed and toward the top of the subjacent cooling zone of the bed. Combustion is maintained in the fluidization zone of the bed and the temperature thereof carefully controlled to be just enough above the decomposition or oxidation temperature of the sludge solids in order to effect efficient calcination thereof without using excessive fuel.

As the solids in the calcination zone are in fully fluidized gas suspension, calcination proceeds apace but there is a gradual controlled rate of descent or sinking of the hot calcined fluidized solids downwardly past the middle section of the bed into the lower or bottom zone of the bed, where due to a lesser quantity and velocity of uprising gas therein, the descending solids are de-fluidized and cease to be gas-suspended, but are capable of downward mass movement resulting in discharge thereof from the reactor because of the controlled and lessened upward velocity of gas they encounter uprising in the de-fluidization zone of the bed. The lesser quantity and velocity of air or gas uprising through this bottom zone of the bed comes thereinto through orifices in the constriction plate which supports the composite bed.

Solids in the fluidized calcination zone are incandescent but in descending or sinking into the de-fluidization zone cool quickly because they radiate or exchange their heat to the uprising gas around them. Actually, the hot solids descend against a stream of uprising cool gas, so there is effected here, countercurrent cooling, whereby heat is stripped rapidly from the descending solids. Therefore by the time the solids discharge to the atmosphere from the de-fluidization zone of the bed, they are quite cool.

Figure 2:
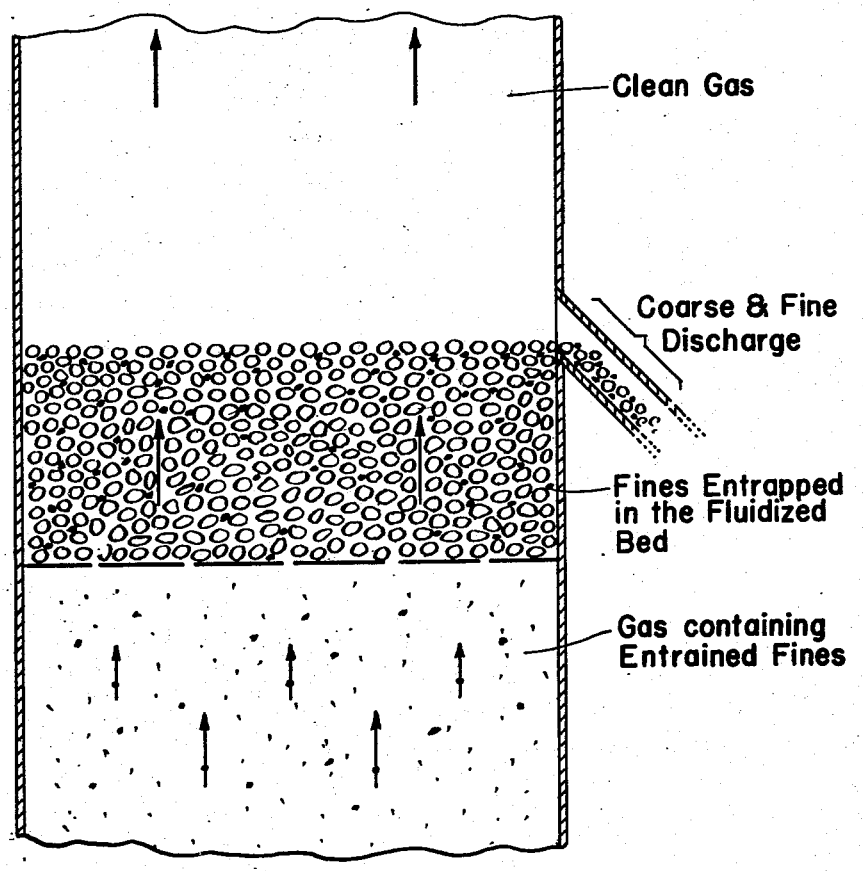

The best embodiment of which I am at present informed is illustrated in the accompanying drawings, but this embodiment is shown by way of example only since it is possible to modify structural and operative details, so long as no departure is made from those required in the appended claims. In the drawings, Fig. 1 is a vertical sectional view of an embodiment of this invention with certain accessories which are helpful in practicing the invention. Fig. 2 is an idealized view showing entrained fines being scrubbed from a gas stream by the coarse fluidized bed and the mixture of coarse and fine solids being discharged.

In Fig. 1 a more complete reactor is shown, usually made of refractory material, and mounted on legs if desired. Above the fluidized bed 13 is a freeboard space 39 defined at its top by a second or upper aperture constriction plate or partition 40 comprised of refractory bricks, one or more of which contain a funnel-shaped aperture 41 (more or less like aperture 36 of Fig. 4) that is topped by a ball check 37 (see Fig. 5). Supported from the upper face of the apertured partition 40 is a preheating bed 42 of fluidized solids having a fluid level 43 determined by a discharge weir 44 formed by the inlet to the pipe or conduit 28. Above the bed is a freeboard space 45 and above that is the top 46 of the reactor. 77 represents a standpipe extending vertically through the partition 40 and the bed 42 which is controlled by a valve 48. This standpipe is for the purpose of by-passing hot gas rising from the calcining bed 13 past the bed 42 into the freeboard space 45.

From the top 46 of the reactor, there rises a stack 47 having an enlarged section 49. The stack terminates in a cyclone 50 from which gas escapes or exhausts through outlet 51 and dust or dried solids spill or descend through a downcomer pipe 53, valved at 54 leading to a pug-mixer trough 55. 56 indicates a rotary filter of well-known type that delivers filter-cake into the pug-mixer 55 which re-pulps or diminutes the cake and mixes it with dried solids spilling through downcomer 53 and delivers the mixture to a motor-driven cage mill 57 in the enlarged section 49 of the stack 47. From the downcomer 53, there is an extension pipe or conduit 58, valved as at 59 that conducts dust or dried solids to a motor-driven screw conveying feeder 61 which supplies the solids into the upper fluidized bed 42 but beneath its fluid level 53. Make-up coarse limestone may be added to the dried finer solids pipe 58 through the make-up pipe 62 for coarse solids controlled as by a valve 63.

Cooling of the solids in the cooling bed section 15 may be facilitated, if desired, by supplying air through pipe 67, valved at 68, leading to a circircular bustle pipe 69 in the reactor base that is equipped with tuyères 70. This air in cooling the solids becomes preheated so this comprises an efficient heat-saving step. Since the cooling bed 15 of solids is more compact than its superjacent fluidized bed 13, it requires less volume so it is advantageous to taper the inside faces of the reactor inwardly toward the bottom, as shown at 71.

It is here pointed out that the bustle pipe and tuyères are used initially to preheat the charge by means of hot combustion gases, to a point where combustion of the normal fuel will take place.

The apparatus described is adapted for the calcination of lime-bearing sludges or muds or precipitates as result from industrial processes. They include water-softening sludge, paper mill sludge that is frequently called causticizing sludge, sugar factory mud or sludge that results from the first carbonation station or other such lime-using stations in sugar factories, and the like.

The starting material is fed to the drying and preheating treatment. The preheating is done preferably in an upper compartment in the reactor 11 wherein a bed 42 of such solids is maintained above a transverse horizontally-extending apertured constriction partition 40 through which hot gases comprising products of combustion taking place therebelow, uprise in such velocity that the solids of this bed are maintained in a state of mobility or fluidization wherein they are like a fluid. The hot uprising gases rise from a calcining combustion zone that is maintained at about 1850° F. and are more than enough to maintain the solids of the preheating fluidized bed at the 1000° F. desired, so a portion must be by-passed (through pipe 77) around the bed to the contact drying step. The uprising gases entrain inevitable some solids continually up out of the bed (however much minimized by the use of this invention) into a superposed cyclone 50 from whence they are conducted through a pipe 58 leading back to the bottom of the preheating bed 42. But a major part of the preheated solids of bed 42 spill over weir 44 into pipe 28 and are then fed to the calcining bed 13 of the reactor through pipe 25 while in air suspension. This is accomplished by air being added to the solids with such force that the solids are carried by the air under pressure directly into the fluidized upper zone A containing the calcination bed 13 in the reactor. Here the solids encounter a calcining temperature of about 1850° F. which is just above the decomposition temperature of the calcium carbonate constituents of the solids, whereupon the solids which is mobilized suspension and fluidization have their calcium carbonate constituents converted into CaO and $CO_2$, namely, they are calcined. Upon being calcined, the solids sink into the lower or cooling zone C. From here, they sink further and descend to discharge as cool end product from the reactor through discharge pipes 19.

In starting up, a preliminary seeding of the calcining bed is required so this is done by supplying thereto through pipe 62 to form the initial bed, coarse limestone or other calcinable solid particles or lumps ranging in size from about minus 14 screen mesh to plus 65 screen mesh (Tyler). If more incandescent lumps are needed in the bed for receiving freshly fed fines, because of attrition of a significant number of the lumps, fresh lumps can be supplied through pipe 62 to enter the fluidized bed at an elevation beneath its upper surface of fluid-level. The valve 63 provided in pipe 62 permits such lumps to be fed from time to time at the will of the operator, but under conditions that freshly fed lines upon entering the bed encounter there a mass of incandescent fluidized coarse particles. In the upper zone A (bed section 13), wherein calcination takes place, fluidization of the solids therein takes place because of the volume and velocity of gas uprising therethrough. Such velocity can be from 4 to 6 feet per second with optimum being 4.5–5.0. The gas, so uprising, is made up from three contributing sources, namely, (1) the gas supplied directly into the fluidization zone which also is a conveying medium for introducing solids into that zone, (2) products of calcination taking place in that zone, and (3) gas uprising into that zone from the subjacent cooling zone C (bed section 15). The velocity of the gas uprising in the subjacent zone may be less than that which produces fluidization of the solids therein and yet be sufficient to permit the solids to migrate thereinto from the superjacent fluidized zone and to sink gradually completely through the cooling zone to discharge. Such velocity is from one-fourth to one-half the velocity in the superjacent fluidization and calcination zone.

Another feature of importance resulting from this manner of construction and operation is due to the fact that there is present in the calcination zone both large solids or lumps and small solids or fines. As the solids of this zone are maintained at calcination temperature, they are incandescent and being fluidized or mobilized, each large incandescent solid is surrounded by a gas space. Fresh solids to be heat-treated in the zone are supplied thereto in finely divided if not pulverulent form, so that they pass into the spaces between two or more large solids or lumps which are feedable through pipe 62 as and when desired due to the presence of valve 63. The incandescent lumps radiate their heat to these newly fed fine solids whereby they are quickly brought up to calcination temperature and the incandescence seems to trap and retain a majority of the finer solids that one would expect otherwise to be blown from the reactor by the velocity of the uprising air that is sufficient to fluidize the larger solids or lumps. Moreover, when these incandescent lumps sink into the subjacent cooling zone, they give up their heat quickly to the gas uprising through that zone and thereby preheat it before it reaches the calcination zone, and this also contributes to the saving in fuel used to heat that zone.

While the invention has been described as applicable to the calcining of lime-bearing sludges or slurries, it may also be used in the burning of cement and in the sintering of red mud (from the Bayer method of processing low-grade bauxite) with limestone and soda ash.

More particularly and referring again to the drawings and especially Fig. 1, it will be pointed out that the lime-bearing sludge or other material to be calcined, is supplied to the filter 56. Filter-cake from the filter drops into the pug-mixer trough 55 where it is repulped or diminuted and mixed with dried solids descending into the pug-mixer from the cyclone 50. The repulped cake and dried solids are then acted upon by the motor-driven cage mill 57, operating in the enlarged section 49 of the stack 47, whereupon they are dispersed amid and rise with the rising stream of hot gases, thus being dried by contact. After drying the sludge is collected in cyclone 50, conveyed in part back to pug-mixer 55 for feed conditioning, the remainder going to bed 42 through conduit 58 and valve 59 whereupon it (the sludge) is preheated to 1000° F. These solids are fluidized by hot gas from the freeboard space 39 uprising through the apertures 41 in the construction partition 40 in such volume and at such velocity, that (1) the ball checks 37 are unseated and thus disperse or diffuse the uprising gas, and (2) the solids of the bed 42 are fluidized or mobilized. When the reactor is shut down, and no gas uprises through the apertures 41, the ball checks 37 become seated and thus seal the apertures 41 against the bed 42 unloading itself downwardly into the next lower bed 13. The uprising gas is hot enough to preheat these solids. Preheated solids flow from the top of the bed or its fluid level 43 over weir 44 and spill down feedpipe 28.

Dried solids or dust from cyclone 50 in excess of that desired to be fed to the pug-mixer 55 falls down pipe 58 to the screw feeder 61 and are thus supplied to the preheating bed 42, beneath the fluid level thereof.

Solids, thus preheated and spilling down pipe 28 are led to pipe 25 where they are joined by a blast of gas or air through pipe 26 with the result that the solids are gas-conveyed to and through the manifold body 18 and thence upwardly through hollow arms 17, and finally they are emitted together with their conveying gas, out into the fluidized bed section 13 past the unseated ball checks 37 from whence they enter the bed 13 where there is present the lumps supplied thereto through pipe 62. If and when gas flows stop, the ball checks 37 seat and prevent solids of the bed 13 from being purged through the arms 17. The bed section 13 and its contents are maintained at calcination temperature by means of burning fuel from pipes 32, either gas or liquid as the case may be, to maintain combustion in that bed. Since the gas supplied with the solids to be treated usually is air, there is enough oxygen present to support calcining combustion at carbonate dissociation or decomposition temperatures.

Incandescent calcined solids descending or sinking from the fluidized bed 13 become de-fluidized because the volume and velocity of the gas supplied through pipe 30 and wind-box 24 as well as through the tuyères 70 is insufficient to fluidize. The deficiency is made up by the additional gas added through the manifold arms 17 so that the solids in the superjacent bed 13 will be fluidized. The sinking solids give up their heat quickly to the gas uprising against their descent so that is an efficient heat transfer and cooling. Cooled, calcined solids discharge from the de-fluidized bed 15 through discharge pipes 19.

Since there is considerably more volume of hot gas in the freeboard space 39 made up of products of combustion and fluidizing gas, it is important to by-pass some of it in order that only enough gas rises through the constriction partition 40 to fluidize the solids in preheating bed 42, and not much more. Such excess gas is by-passed up standpipe 77 that is controlled by valve 48.

With respect to the several valves hereof, they have been indicated in a conventional manner. Valves adapted for meeting the required uses are well known and should accordingly be so selected, for example, valves such as 59, 63, 54, 29 and 23 can well be of types known as rotary or star valves since they execute the function of pressure locks.

I claim:
1. The process for retaining fine solids in an incandescent fluidized bed for treatment therein under conditions for normally entraining such fine solids, which comprises establishing and maintaining a fluidized bed containing relatively coarse incandescent bed solids by supplying such coarse solids to the bed while upflowing gas therethrough at a velocity sufficient to maintain the solids in a turbulently mobilized non-stratifying fluidized condition, continually supplying to the bed for treatment therein gas-entrained fine solids, said solids lying in a size and specific gravity range that would normally be entrained by the fluidizing gas at the velocity selected to fluidize the bed, discharging from the bed a mixture of bed solids and treated fine solids, and retaining such fine solids in the bed until they have been treated therein and subsequently discharged therefrom by maintaining the relatively coarse bed solids to lie in a size range of from substantially −14 to substantially +65 screen mesh, whereby fine solids are retained in the bed for treatment therein under conditions which would normally entrain such fine solids and carry them from the bed.

2. The process according to claim 1, wherein the content of bed solids in the bed is renewed from time to time by the independent addition of such solids to the bed.

3. The process according to claim 1, wherein the content of bed solids in the bed is renewed from time to time by the direct addition of such solids to the bed at an elevation below its top surface.

FRANK S. WHITE.

References Cited in the file of this patent

UNITED STATES PATENTS

| Number | Name | Date |
| --- | --- | --- |
| 124,097 | Taylor | Feb. 27, 1872 |
| 692,257 | Eldred | Feb. 21, 1902 |
| 714,842 | Wentz | Dec. 2, 1902 |
| 2,270,903 | Rudback | Jan. 27, 1942 |
| 2,300,042 | Caldwell | Oct. 27, 1942 |
| 2,304,827 | Jewell | Dec. 15, 1942 |
| 2,367,281 | Johnson | Jan. 16, 1945 |
| 2,393,909 | Johnson | Jan. 26, 1946 |
| 2,409,707 | Roetheli | Oct. 22, 1946 |
| 2,409,787 | O'Neal et al. | Oct. 22, 1946 |
| 2,465,410 | White | Mar. 29, 1949 |
| 2,529,366 | Bauer | Nov. 7, 1950 |